United States Patent [19]
Sodani et al.

[11] Patent Number: 5,845,103
[45] Date of Patent: Dec. 1, 1998

[54] COMPUTER WITH DYNAMIC INSTRUCTION REUSE

[75] Inventors: Avinash Sodani; Gurindar S. Sohi, both of Madison, Wis.

[73] Assignee: Wisconsin Alumni Research Foundation, Madison, Wis.

[21] Appl. No.: 876,137

[22] Filed: Jun. 13, 1997

[51] Int. Cl.$^6$ ............................................ G06F 9/30
[52] U.S. Cl. .................... 395/392; 395/376; 395/381; 711/133; 711/137
[58] Field of Search ................... 395/376, 392, 395/381; 711/126, 183, 137

[56] References Cited

U.S. PATENT DOCUMENTS

| | | | |
|---|---|---|---|
| 4,683,547 | 7/1987 | DeGroot | 364/748.13 |
| 5,163,154 | 11/1992 | Bournas et al. | 395/800.42 |
| 5,570,459 | 10/1996 | Kam | 395/110 |
| 5,630,049 | 5/1997 | Casdoza et al. | 395/183.01 |
| 5,694,568 | 12/1997 | Harrison, III et al. | 711/137 |
| 5,774,386 | 6/1998 | Pawle | 364/723 |

OTHER PUBLICATIONS

Stuart F. Oberman, et al., "On Division and Reciprocal Caches", Apr. 1995.

Stephen F. Richardson, "Caching Function Results: Faster Arithmetic by Avoiding Unnecessary Computation", Sep. 1992.

Mikko H. Lipasti et al., "Value Locality and Load Value Prediction", Oct. 1996.

Mikko H. Lipasti et al., "Exceeding the Dataflow Limit via Value Prediction", Dec. 1996.

James E. Smith et al., "Implementing Precise Interrupts in Pipelined Processors", 1988.

Samuel P. Harbison, "An Architectural Alternative to Optimizing Compilers", 1982.

*Primary Examiner*—William M. Treat
*Attorney, Agent, or Firm*—Quarles & Brady

[57] ABSTRACT

A computer architecture allowing reuse of previously determined instruction results, indexes instruction results according to instruction addresses. The continued validity of operand values in registers or memory for the instructions is determined prior to the fetching of any given instruction by an invalidation system which detects an intervening register or memory write. Thus, the need to evaluate the operand values themselves which would delay execution is avoided. In one embodiment, dependencies for operands between instructions are recorded so as to avoid invalidating instructions having operand register or memory locations which are overwritten when the overwriting will be corrected by an intervening instruction immediately preceding the dependent instructions.

11 Claims, 6 Drawing Sheets

COMPUTER WITH DYNAMIC INSTRUCTION REUSE

This invention was made with United States government support awarded by the following agencies:

ARPA Grant No.: DABT63-95-C-0127

NSF Grant Nos.: CCR-9303030 and MIP-9505853

DOD-Navy Grant No.: N00014-93-1-0465.

The United States has certain rights in this invention.

BACKGROUND OF THE INVENTION

The invention relates generally to computer architectures and in particular an architecture allowing for the reuse of the results of previously executed instructions.

Electronic computers may execute programs having instructions stored in memory at instruction addresses. The instructions are comprised of operands and operators; the operands being values operated on according to a rule defined by the operator to produce a result. A typical instruction will have one or more operand fields, an operator field, and a result field indicating where the result is to be stored. The operands may be values contained in the instruction itself or more typically will be the name of a register within the computer or an address in the computer's memory holding the value to be used. Likewise, the result may be directed toward a register or computer memory. In more complex instructions registers or memories will point to other registers and memories holding the ultimate operand value.

During execution of the program, instructions are fetched from memory, executed and the results stored according to the synchronizing pulses of a clock. Efforts to provide faster execution of computer programs have focused on increasing the clock speed of the processor and in increasing the number of instructions executed per clock cycle.

In this latter approach, the number of instructions executed per cycle may be increased by out-of-order instruction processing in which stalled instructions, for example those waiting for data, may be by-passed and later instructions independent of the stalled instruction executed.

The number of instructions executed per cycle may also be increased by speculative execution in which instructions are executed, for example, after an unresolved branch statement, based on a prediction of the outcome of the branch. In speculative execution, if the prediction of the branch outcome is wrong, the executed instructions must be "squashed" and the correct branch executed. Sometimes the "squashed" instructions include instructions after the branch that were common to both branch paths. After out-of-order execution, the instructions are "committed" in order to ensure that stores to the memory and to registers are made correctly.

Faster execution of a computer program may also be obtained by reducing the number of instructions that must be executed. This may be accomplished by "static" or pre-execution optimization of the software, for example, with optimizing compilers.

The number of instructions to be executed may also be reduced "dynamically" by re-using the results of previously executed instructions having the same operands. For example, in a complex arithmetic instruction such as division, the operands (i.e. the dividend and divisor) may be stored in memory together with the result or quotient. If the same two operands are later encountered in a division instruction, the stored result may be used instead of re-calculating the result of the division with the possible saving of substantial execution time. The results are stored in a table as indexed by their operands.

A significant draw back to such result reuse is that it requires the operand values to be known before stored results (if any) can be recalled. The operand values or addresses are typically not known until later in the execution cycle of the instruction. Accordingly, this technique is only useful for extremely complex instructions which require multiple cycles to complete, such as division. Otherwise the burden of determining whether the instruction has previously been computed exceeds the gain in speed from avoiding execution of the instruction. The requirement that there be large numbers of complex instructions for a speed gain to be realized, may make such techniques impractical for use in a general purpose processor.

BRIEF SUMMARY OF THE INVENTION

The present invention provides a system of instruction reuse that can provide speed gains with most computer instructions. The invention eliminates the need to resolve the values of the operands or their addresses prior to determining whether an instruction result may be reused. This is done by indexing the table of previous results, not by operand values but by an index based on the instruction address together with one or more invalidity flags indicating whether the operands at instruction defined locations have changed since the last time the instruction was executed. As a result, the invention provides speed gains in re-using even very simple instructions, and consequently potentially greater increases in execution speed. By avoiding the need to evaluate operand values prior to evaluating reuse, dependent chains of instructions may be reused in a single execution cycle without the need to wait for the operands of each instruction before evaluating the next instruction.

Specifically, the present invention provides a computer for executing a program of instructions, the instructions having at least one operand and being stored in memory at an instruction address. The computer includes fetching circuitry, obtaining a fetched instruction from memory at a fetched instruction address, and execution circuitry selectively executing the fetched instruction to produce a result. The computer also includes a reuse memory communicating with the fetching circuitry and holding linked operand identifiers, results, and indices based on instruction addresses from previously executed instructions. Search circuitry receives the instruction address of the fetched instruction and searches the reuse memory for a valid matching entry having an instruction address matching the fetched instruction address. When a valid matching entry is found, the search circuitry instructs the execution circuitry to by-pass the execution of the fetched instruction and use the result of the matching entry.

Thus, it is one object of the invention to index a table of re-usable instruction results with the address rather than the operand of the fetched instruction. The present inventors have recognized a significant number of dynamic instances of an instruction have the same operands. Accordingly an indexing scheme using instruction addresses will obtain valid precomputed results for the instruction a significant portion of the time.

The entries in the reuse memory may include an invalidity flag indicating whether the result stored in the entry is valid based in light of instructions executed prior to the fetched instruction. The search circuitry accepts a matching entry as valid depending on the indication of the invalidity flag.

Thus it is another object of the invention to wholly eliminate the need to evaluate operands in determining whether an instruction result may be reused. Because operand values are not required, searching the reuse memory may be begun as the instruction is decoded without slowing execution of the instruction if no reusable result has been obtained. The invalidity flag may be determined prior to the fetching of a given instruction and thus does not slow the execution of the fetched instruction. Eliminating the need to evaluate operands allows the results for multiple instructions to be reused simultaneously.

The invalidity flag may be set by invalidation circuitry communicating with a REGISTER STORE detection circuit detecting a store operation to a named register occurring prior to the fetching of the fetched instruction. The invalidation circuitry sets the invalidity flag of entries having operand identifiers identifying the named register to indicate the entries are invalid.

Thus, it is one object of the invention to provide a simple mechanism for determining the validity of an entry in the reuse table when the instruction employs operands in named registers. Simply by determining that the named registers have not had their contents changed since the last use of the instruction, allows the instruction to be reused without evaluating the actual values of the operands.

The invalidation circuitry may also communicate with a STORE detection circuit detecting store operations to a memory address occurring prior to the fetching of the fetched instruction. The invalidation circuit sets the invalidity flag of entries having operand identifiers identifying the memory address to indicate the entries are invalid.

Thus, it is another object of the invention to provide a determination of the invalidity flag prior to the fetching of a given instruction where that instruction relies on a memory location for one or more operands. Again, simply by determining that the memory location has not been overwritten since the last execution of the instruction allows the instruction to be reused without actual evaluation of the operands.

The instruction reuse memory may include two sections, a LOAD section holding operand identifiers and results for LOAD instructions loading data from memory, and a non-LOAD section holding operand identifiers and results for instructions other than LOAD instructions.

Thus, it is another object of the invention to reduce the amount of memory required in the reuse memory by distinguishing between LOAD and non-LOAD instructions. Generally, a non-LOAD instruction requires less data in an entry. For a LOAD instruction it is necessary to determine that the memory location of the LOAD instruction has also not been overwritten as well as registers used in address calculation.

Each entry of the reuse memory may further hold a source index value identifying a source instruction (i.e., by its entry) whose result provides a value of an operand identified in the entry. The invalidation circuitry may invalidate an entry only when the source index value of the entry indicates no source instruction for that entry.

Thus, it is another object of the invention to prevent the invalidation of instructions that are dependent for all their operands on a previous uninvalidated instruction in the reuse memory. These source instructions correct the register values used by the dependent instructions regardless of intervening overriding of those registers.

The invalidation circuitry may further invalidate entries in the reuse memory whose source indices indicate an instruction of an invalidated entry.

Thus, it is another object of the invention to invalidate additional entries in the reuse memory if their source entries have been invalidated.

The source index value for an entry may be determined by reviewing a register source table indicating a last instruction to update a register of the computer. The source index value for an entry may be the instruction of the register source table having a common operand with the operand identifier of the entry.

Thus, it is yet another object of the invention to provide a simple mechanism for establishing dependencies between instructions on a dynamic basis.

The foregoing and other objects and advantages of the invention will appear from the following description. In this description, reference is made to the accompanying drawings which form a part hereof and in which there is shown by way of illustration a preferred embodiment of the invention. Such embodiment does not necessarily represent the full scope of the invention, however and reference must be made therefore to the claims for interpreting the scope of the invention.

DETAILED DESCRIPTION OF THE INVENTION

General Features of the Architecture

Figure 1:
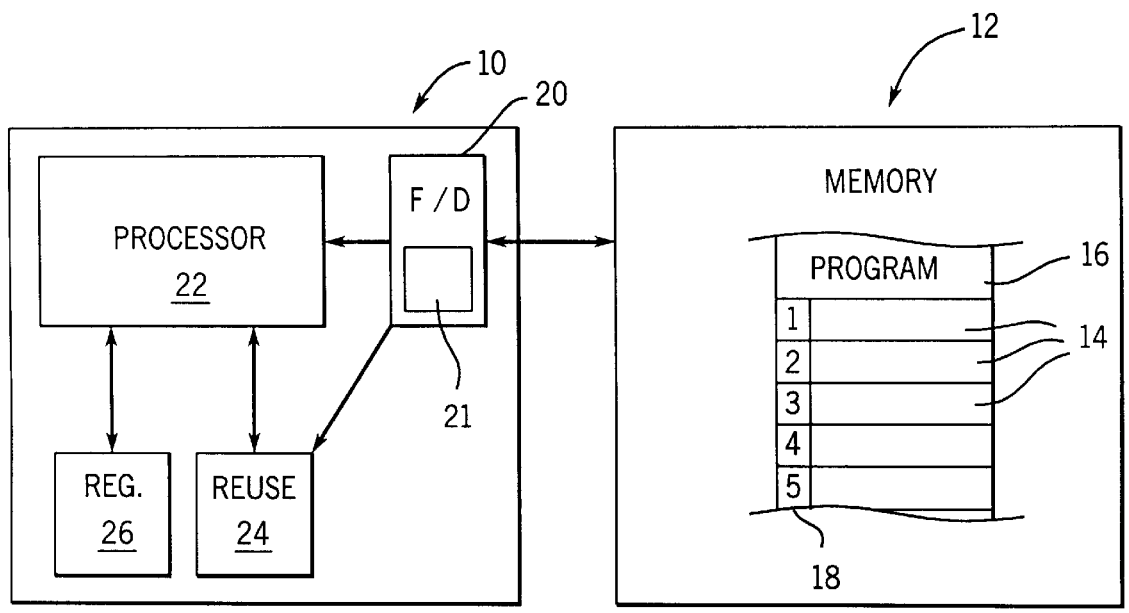
FIG. 1 is a simplified block diagram of a computer processor and memory showing incorporation of the instruction reuse circuitry of the present invention.

Referring now to FIG. 1, the computer architecture of the present invention includes a processor unit 10 communicating with memory 12 to receive instructions 14 of a program 16 for execution. Each instruction has a static order and is located at a unique and identifiable address 18.

The processor unit 10 includes a fetch/decode unit 20 having an internal program counter (not shown) tracking the address 18 of the instruction 14 being fetched. The fetched and decoded instructions will be transmitted together with the value of the program counter to reuse circuitry 24.

The reuse circuitry 24 in turn provides some of the instructions that it receives to the processor 22 for execution or according to the present invention, provides a result of a previous execution of those instructions, stored by the reuse circuitry 24, to the processor 22 with instructions that the processor 22 should skip execution of that instruction and use the result provided.

The processor 22 may be a speculative out-of-order processor as are generally know in the art and communicates with one or more registers 26 used as temporary storage for instruction operands and their results. Information about register storage is provided by the processor 22 to the reuse circuitry 24. The processor 22 communicates directly with memory for the access and storage of data values by additional interconnection lines not shown for clarity. Information about memory storage is also provided by the processor 22 to the reuse circuitry 24.

Generally, all instructions are forwarded to the reuse circuitry 24 to determine whether the results of a previously executed instruction may be reused in this circumstance.

Figure 2:
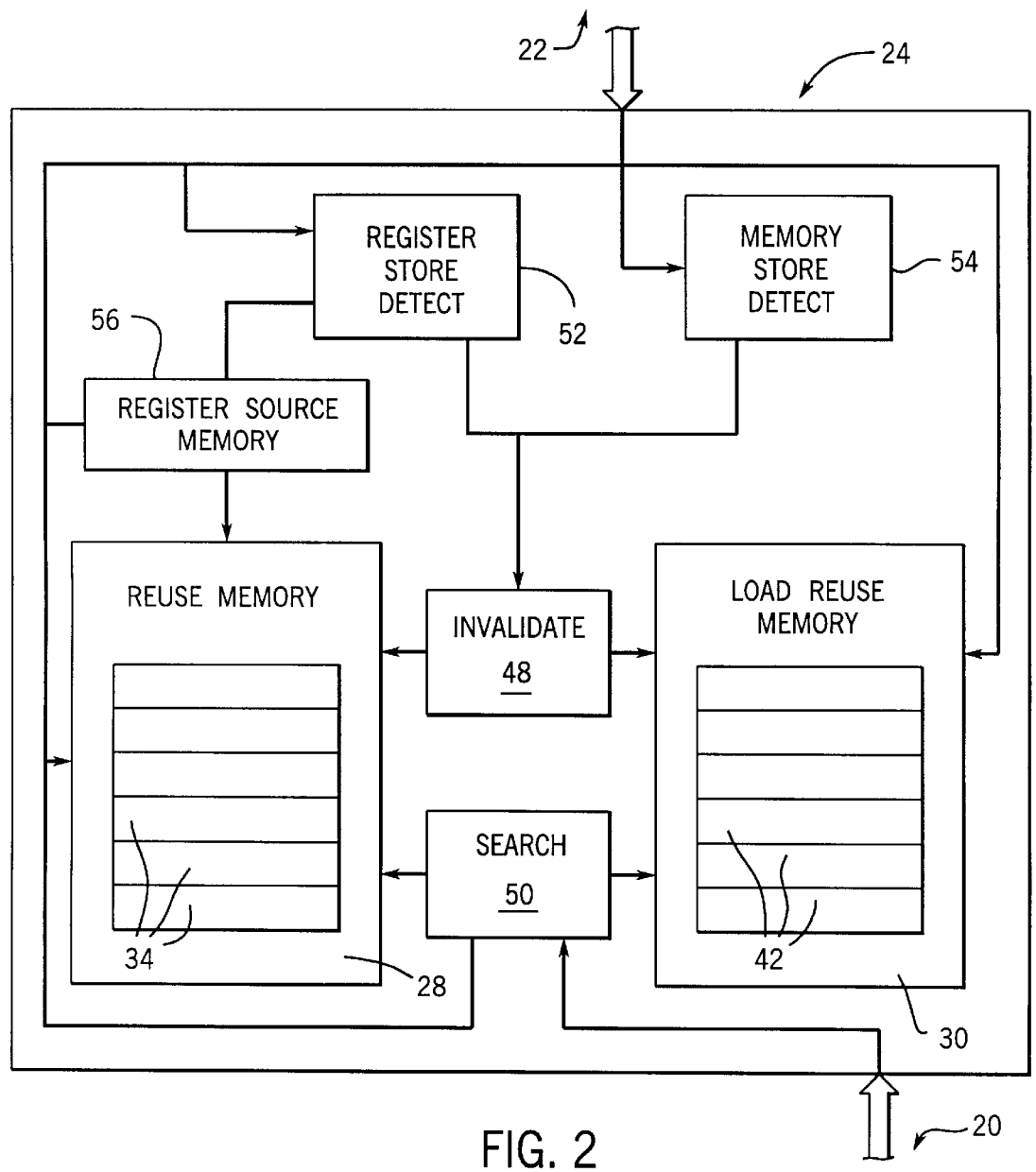
FIG. 2 is a block diagram of the instruction reuse circuitry of FIG. 1 showing reuse memories holding results of previously executed instructions and a register source table identifying instructions that change register values.

Referring now also to FIG. 2, the reuse circuitry includes a reuse memory 28 and LOAD reuse memory 30 intended to store the results of previously executed instructions. These stored results must be indexed so as to be quickly found as new instructions are fetched. In the present invention, such indexing is according to the value of the program counter 21 holding the address 18 of the particular fetched instruction.

Figure 3:
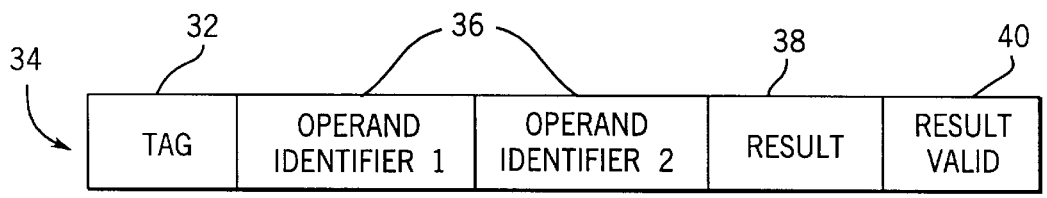
FIG. 3 is a tabular representation of one entry of a reuse memory associated with an instruction other than a LOAD instruction.

Referring to FIG. 3, the reuse memory 28 includes a number of entries 34 indexed according to a value based on an address in the program of a instruction on which the entry is based. As depicted, each entry is indexed by a index value 31 and a tag 32. It will be understood that the index 31 need not actually be stored as depicted but may be implicit in the indexing method which finds an entry as if the index 31 had been reviewed. In the simplest case, the index 31 is identical to a value of the program counter 21 and hence a given entry 34 may be quickly accessed by matching the program counter 21 to the index 31 of the entries 34. More generally, the index 31 is a compressed version of the addresses 18 of the program counter 21 including for example, the least significant bits of the addresses 18 or some other number correlated to particular addresses. In such circumstances, the index 31 will not uniquely identify a particular instruction 14 and the value of the tag 32 is used to correct for this situation by providing more information (e.g., the most significant bits of the address 18) that uniquely identified an entry 34. The index 31 may also be a combination of the program counter 21 with a value such as a branch history register which records the path of previous branches in the program such as in known in the art. This combination provides an index reflecting not merely the particular instruction but also the path the program took to arrive at that instruction.

Linked to each index 31 and tag 32 by the entry 34 are one or more operand identifiers 36. In the simplest case, the operand identifiers are actual operand values, however, the operand identifiers 36 may also be names of registers such as $r_1$, $r_2$, or memory addresses of the memory 12 where the operand values may be found.

Linked also by the entry 34 to the index 31 and tag 32 and the operand identifiers 36 is a result 38 being a value produced when the instruction 14 of index 31 was previously executed. In one embodiment, the entry 34 also includes a result invalidity flag 40 as will be described.

Figure 4:
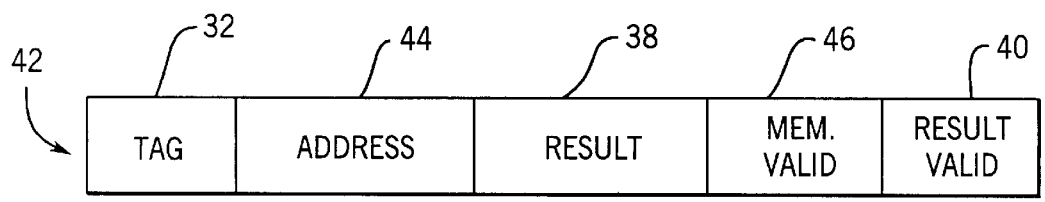
FIG. 4 is a tabular representation of one entry of a reuse memory associated with a LOAD instruction.

Referring also to FIG. 4, in contrast to the entries 34 of the reuse memory 28, the entries 42 of the LOAD reuse memory 30 do not include the operand identifiers 36 but instead an address field 44 designating the address of the memory 12 from which data will be loaded and a memory invalidity flag 46 indicating whether the contents of that address have changed since the last execution of the instruction 14. The entries 42 include the index 31 and tag 32 for indexing the entries 42 and a result 38 as was the case with the entries 34.

Referring again to FIG. 2, the reuse circuitry 24 also includes invalidation circuitry 48 communicating with the reuse memory 28 and LOAD reuse memory 30 and capable of setting or re-setting the result invalidity flag 40 and the memory invalidity flag 46 as will be described.

Also communicating with the reuse memory 28 and the LOAD reuse memory 30 is a search circuitry 50 which may identify entries 34 or 42 according to their indices 31 and tags 32. Generally, the search circuitry 50 searches the reuse memory 28 and LOAD reuse memory 30 using parallel methods and thus provide a virtually instantaneous identification of relevant entries 34 or 42.

The search circuitry 50 also writes the entries 34 or 42 when instructions 14 are executed, taking the operand identifiers and results of the instruction 14 and placing them within the appropriate reuse memory 28 or LOAD reuse memory 30. Further operation of the search circuitry will be explained with reference to the flow charts to follow.

In some embodiments of the invention, REGISTER STORE detection circuitry 52 and STORE detect circuitry 54 are present to respond to the execution of instructions which store to a register or to memory (as signaled by the processor 22) and to provide the register name or memory address to the invalidation circuitry 48 for invalidation of corresponding entries 34 or 42 as will be described.

A register source memory 56 may also be included in yet another embodiment. The register source memory 56 indicates the last instruction to write to a particular register 26 of the processor unit 10. This register source memory 56 will also be described in greater detail below.

Operation of the Reuse Circuitry When Operand Identifiers are Register Names

Figure 5:
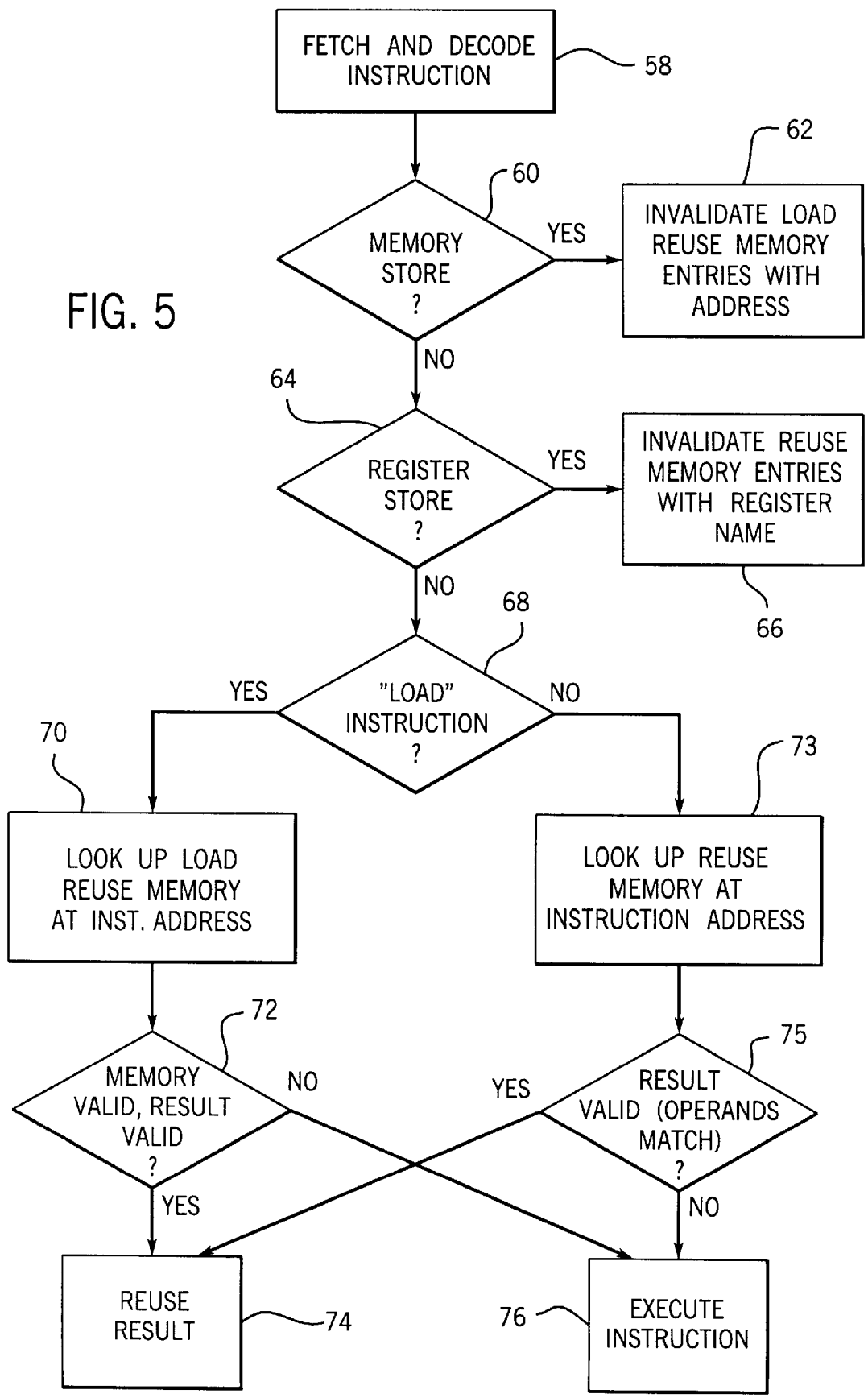
FIG. 5 is a flow chart showing the operation of the processor and reuse circuitry of FIGS. 1 and 2 in re-using instructions during program execution.

Referring now also to FIG. 5, the reuse circuitry 24 of FIGS. 1 and 2 during operation, receives instructions from the fetch/decode unit 20 prior to execution of the instruction. Generally, the receipt of instructions is indicated by process block 58.

The instruction is examined by the reuse circuitry 24 to see if it is a STORE instruction, that is an instruction causing data to be stored to a location in memory 12 as indicated by decision block 60. STORE instructions are not reused in the present invention because of the possibility that other devices accessing the memory 12 and expecting an actual store operation to occur. Nevertheless, after execution, STORE instructions are passed to the reuse circuitry 24 and used to trigger an invalidation indicated by process block 62.

The invalidation is performed, at the time the execution of the instruction is committed, by the invalidation circuitry 48 and causes the invalidation of entries 42 within the LOAD reuse memory 30 if those entries 42 have an address field 44 matching the store address of the STORE instruction received from the fetch/decode unit 20. The invalidation involves simply setting the memory invalidity flag 46 to one. The purpose of this invalidation is to ensure that instructions are not reused if they rely on the data at that memory address as an operand. Invalidation indicates that the memory contents may have changed and the result computed from these memory contents may no longer be valid.

Alternatively, the LOAD reuse memory 30 may be corrected with the new value of the memory address reflected in its result field 38.

Referring still to FIG. 5, if the instruction is not a STORE instruction, the reuse circuitry 24 proceeds to decision block 68. Decision block 68 determines whether the instruction is a LOAD instruction as implemented by the search circuitry 50. A LOAD instruction is one which reads a value from memory 12 and is distinguished from other instructions so as to properly direct the search circuitry 50 to the proper one of the reuse memory 28 and the LOAD reuse memory 30 as has been described above. Typically a LOAD instruction includes an address resolution portion and an actual loading portion loading a value into memory. A LOAD instruction, for the purpose of decision block 68 is only the loading portion of the instruction, the address resolution portion of the instruction will be considered not to be a LOAD instruction for the purpose of decision block 68.

If the instruction is a LOAD instruction, the search circuitry 50 proceeds to process block 70 and looks up in the LOAD reuse memory 30 an entry 42 according to the instruction address of the fetched instruction. This instruction address is as stored in the program counter 21 is forwarded by the fetch/decode unit 20. If there is a valid entry 42 at the instruction address as indicated by decision block 72, then the stored result 38 of this entry is passed to the processor 22 as indicated by process block 74 together with a command that the processor 22 use this result instead of executing the instruction. A valid entry means that: (1) there is a match of the index 31 and tag 32 of the entry 42 with the instruction address of the current instruction, (2) that result invalidity flag 40 is set to zero, and (3) the memory invalidity flag 46 is set to zero.

If at decision block 72 there is no valid entry 42, then the circuitry proceeds to process block 76 and the processor 22 executes the instruction as normal. After the instruction is executed by the processor 22 it is again received by the search circuitry 50 and the relevant information from the instruction including the operand identifiers and result are stored as an entry with the appropriate index 31 and tag 32.

If the instruction at decision block 68 is not a LOAD instruction, then the reuse circuitry 24 proceeds to process block 73 and the reuse memory 28 is examined to find an entry 34 having an index and tag 32 corresponding to the instruction address of the fetched instruction. Next at decision block 75, the result invalidity flag 40 of the entry 34 is examined to see if the result 38 may be relied upon. If so, the circuitry proceeds to process block 74 as has been described, but if not the instruction is executed by the processor 22 at process block 76 as has been described. After execution of the instruction the reuse memory 28 is updated as has been described to providing an entry 34 of the result of the instruction.

After reuse of the instruction per process block 74 or execution of the instruction after process block 76, if a register has been overwritten, the program proceeds to process block 66 and the any entries in the reuse memory 28 having the overwritten register as an operand are invalidated. The invalidation involves setting the invalidation flag 40 to one.

In this first embodiment of the invention, the operand identifiers are simply register names; therefore, the values of the operands need never be evaluated. In fact, the operand identifiers 36 themselves are not used by the search circuitry 50 at all but are provided only for the purpose of invalidation circuitry 48 which must identify operand sources for the purpose of invalidating entries upon a register overwriting instruction per process block 66.

Figure 6:
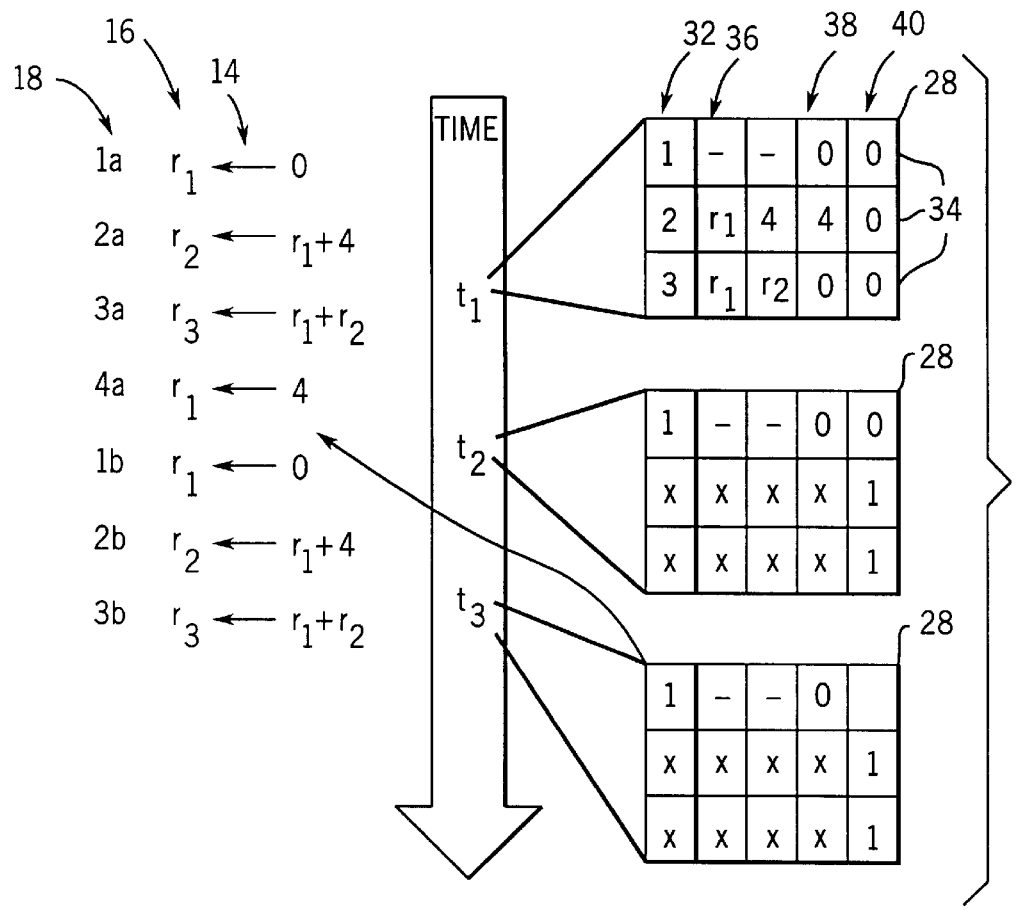
FIG. 6 is a graphical representation of the execution of instructions according to the flow chart of FIG. 5 showing the modification of the reuse memory with time.

Referring now to FIG. 6, an example program 16 is shown together with reuse memory 28, the latter indicated as a single table for clarity. The program 16 has instructions 14 at addresses 18 (designated by numbers 1, 2, and 3) which are executed at different instances designated by letters a and b. The first instruction 1 places a value of zero into register $r_1$, the loading indicated by the left facing arrow. When the first instance of this instruction is fetched (1a), at process block 73, no entry 34 will be found in the reuse memory 28 and hence the reuse circuitry 24 will cause the processor 22 to execute the instruction at process block 76. Upon execution, the operand identifiers 36 and result 38 of the instruction 1a will be placed within the reuse memory, 28 as indicated in the first row of that memory. In particular, the index 32 will be 1, the first operand identifier will be blank indicating that the operand zero is contained in the instruction itself and there is no need to refer to a register or memory location and there will be no second operand identifier. The result will be zero. The result invalidity flag 40 is set to zero indicating that the entry is valid.

At a next instruction instance 2a, register $r_2$ is loaded with the sum of 4 plus the contents of $r_1$. Again there is no reuse of a result because no valid entry 34 is found in reuse memory 28 and the instruction is executed by the processor 22. After the instruction is executed, the entry 34 is created with the index 31 set to 2, the first operand identifier 36 set to $r_1$ and the second operand identifier 36 blank because operand 4 is contained in the instruction. The result of this operation is 4 and the result invalidity flag 40 is set equal to zero.

Finally at instruction instance 3a (indicated at time $t_1$, register $r_3$ is loaded with the sum of the contents of $r_1$ and $r_2$. The processor 22 executes this instruction too, and an entry 34 is created. The index 31 for this entry is 3, the operand identifiers 36 are $r_1$ and $r_2$, the result 0 and the result invalidity flag 0. All are loaded at a third entry 34 of reuse memory 28.

At a next instruction instance 4a (at time $t_2$), register $r_1$ is loaded with a new value 4 overwriting the value 0 previously loaded at instruction 1a. This register overwriting instruction is detected at process block 66 and the reuse memory entries 34 using that register name are invalidated. The register name in this case is $r_1$ and that name is found in entries 34 having index numbers 2 and 3. These entries 34 are invalidated by the setting of the result invalidity flag 40 to 1. The values of X in the reuse memory 28 indicate that the entry as a whole has been invalidated at $t_2$.

When instruction 1 is again executed at instance b, at time $t_3$, the index number 1 is used to index the reuse memory 28 and a valid entry is found at its first row. The result 0 of this entry is then reused.

On the other hand, instruction instances 2b and 3b find no valid and matching entries in reuse memory 28 and therefore are executed anew by the processor 22 according to process block 76.

Even without the intervening instruction 4b the instruction instances 2b and 3b will have their entries invalidated by the occurrence of instruction 1b per process block 66.

Accordingly, a second embodiment may be used in which the actual values of the operands replace their names. Significantly in a processor with out-of-order execution, the checking of reuse memory 28 for pre-computed results 38 may be performed well before the individual instructions 14 have begun execution. Thus, the time taken to reviewing reuse memory 28 for previous results, does not significantly increase execution time.

Operation of the Reuse Circuitry When Operand Identifiers are Operand Values In an alternative embodiment, the register names placed in the operand identifiers 36 of reuse memory 28 may be replaced with the actual values of those operands eliminating the need for the register store detect circuitry 52. In this case, the flow chart of FIG. 5 eliminates process block 66. At decision block 75 the matching of the result invalidity flag becomes instead simply a matching of the operand values.

The advantage of placing the operand values directly in the entries 34 is principally in allowing more instructions to be reused.

Figure 8:
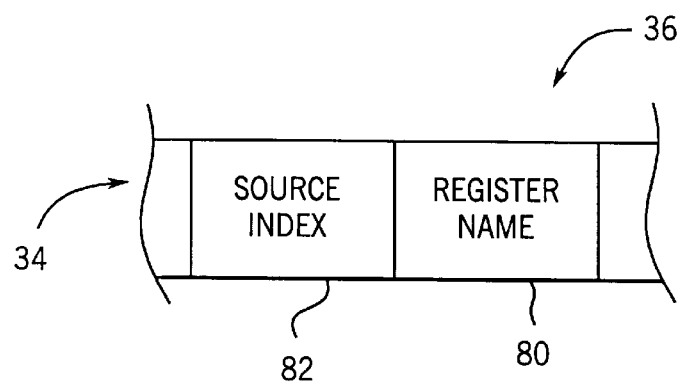
FIG. 8 is a detailed representation of the operand identifier of FIG. 3 of the alternative embodiment providing a source index number indicating a dependency of the instruction.

Operation of the Reuse Circuitry When Reuse Memory Entries Include a Source Index Reviewing the example of FIG. 6, it can be seen that the entries 34 in reuse memory 28 with indices 2 and 3 need not have been invalidated at time $t_3$. This is because even though at instruction instance 4a, register $r_1$ was overwritten, the register $r_1$ was restored to its earlier value by instruction instance 1b. Instruction instances 2b and 3b may be termed "dependent" instructions as they rely for their operand values on the execution of a preceding "source" instruction 1b. Instruction 3b is dependent both on instructions 1b and 2b, instruction 2b is dependent only on instruction 1b and instruction 1b is independent as it depends on no prior instruction. This distinction may be used in yet another embodiment of the invention in which the operand identifiers 36 are expanded to include a register name 80 and a source index 82 as shown in FIG. 8.

The source index 82 indicates whether the instruction of the given entry 34 relies on another instruction in the reuse memory for the values of its operands. The source instruction is identified by its index 31. Thus the source index of instruction 2b of example of FIG. 6 would be the instruction of index 1 (i.e., 1) whereas the source index for instruction 3b would be the instructions of index 1 and 2 (i.e., 1, 2).

Figure 7:
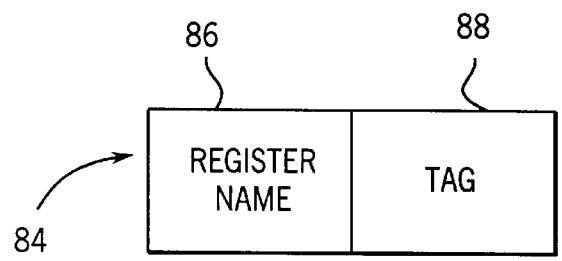
FIG. 7 is a tabular representation of an entry the register source table of FIG. 2 used in an alternative embodiment.

The determination of these source indices may be performed by the search circuitry 50 when an entry is made by reviewing the contents of the register source memory 56 (shown in FIG. 2). Register source memory 56 includes a number of entries 84 shown in FIG. 7, each entry linking a register name 86 such as $r_1$–$r_3$ to a tag 88 equivalent to one of the tags 32 of a reuse memory 28 or LOAD reuse memory 30 and to an invalidity bit 89. Again it will be understood that the register name need not actually be stored but will typically be implicit in the indexing mechanism. The register source memory 56 communicates with the REGISTER STORE detection circuitry 52 to store a register name every time a register is loaded together with the tag of the instruction loading that register. Accordingly, the register source memory 56 provides an indication of the last instruction to load a given register 26 of the processor unit 10.

When the search circuitry 50 creates an entry in the reuse memory 28 or LOAD reuse memory 30, the source index 82 for that entry is determined by reviewing the register source memory 56 to find a register name 86 matching the register name 80 of the entry being constructed. The tag 88 in the register source memory 56, associated with register name 86 and matching register name 80 is then used as the source index 82. As will be seen, the validity of the entry in the reuse memory 28 or LOAD reuse memory 30 for the source instruction and associated with tag 88 then provides information as to whether the source instruction has been invalidated.

Figure 9:
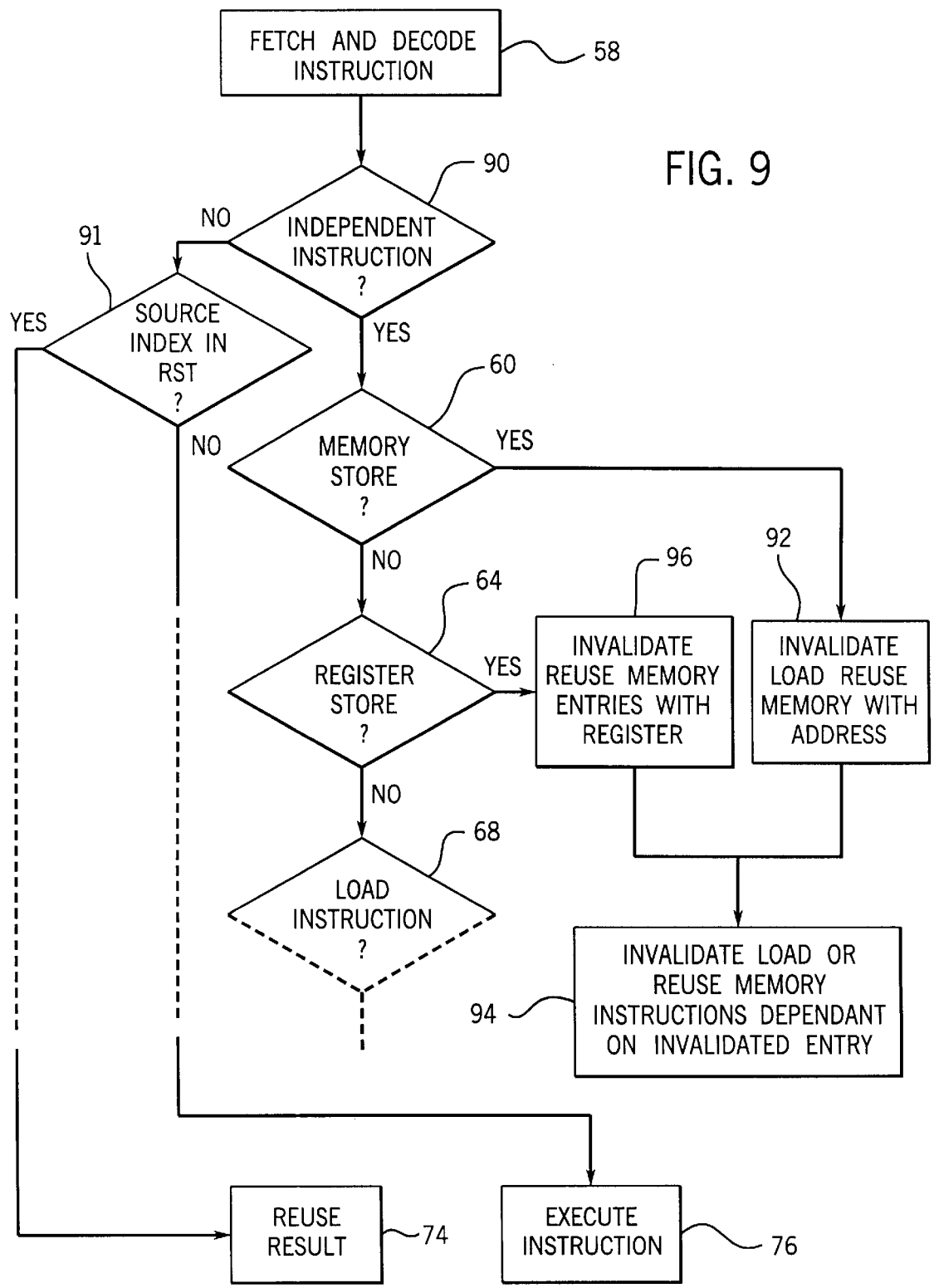
FIG. 9 is a flow chart similar to that of FIG. 5 showing operation of the circuitry of FIGS. 1 and 2 in the alternative embodiment.

FIG. 9 provides a flow chart adding to and modifying that of FIG. 5 for this alternative embodiment employing source indices 82. As with the flow chart of FIG. 5, an instruction is provided to the reuse circuitry 24 at process block 58. At succeeding decision block 90, the instruction is tested to determine if it is an independent instruction by reviewing the entries in the reuse memory 28 or the LOAD reuse memory 30 (having a index 31 matching the instruction address) to see if any entries have a source index 82 value. If so, the instruction is not independent and at decision block 91 the register source memory 56 is reviewed using an index of tag 88 to find a valid second entry.

If a valid second entry can be found in the reuse memory 28 or LOAD reuse memory 30 at the source index, then the current instruction is still valid and the result 38 of the first entry may be reused at block 74.

If a valid second entry can not be found, that indicates the instruction operands have changed and the reuse circuitry 24 proceeds to previously described process block 76 and the instruction is re-executed.

Referring again to decision block 90, if the instruction is independent as determined by a review of its source indices (i.e. no tag number is provided in the source index) then the reuse circuitry 24 proceeds to a STORE test of decision block 60 similar to that of FIG. 5 to see if the instruction is a STORE instruction to a memory location.

If so, at process block 92 the entry 42 in the LOAD reuse memory is invalidated. Note that this invalidation only occurs with independent instructions as a result of the previous branching at decision block 90. Dependent instructions are not invalidated when their operand memory addresses of the operands have been overwritten because the independent source instruction may correct for this overwriting prior to execution of the dependent instruction.

If at decision block 60 the instruction is not a STORE instruction, then at succeeding decision block 64 similar to decision block 64 FIG. 5, the instruction is examined to see if it is a REGISTER STORE instruction. If so, the reuse circuitry 24 proceeds to process block 96 and the entry 34 of the reuse memory 28 for the instruction is invalidated.

Again, this situation will only occur for independent instructions.

If the instruction is not a STORE instruction, the reuse circuitry 24 proceeds to process block 68 as described with reference to FIG. 5 and succeeding process blocks as have been previously described with respect to FIG. 5.

Figure 10:
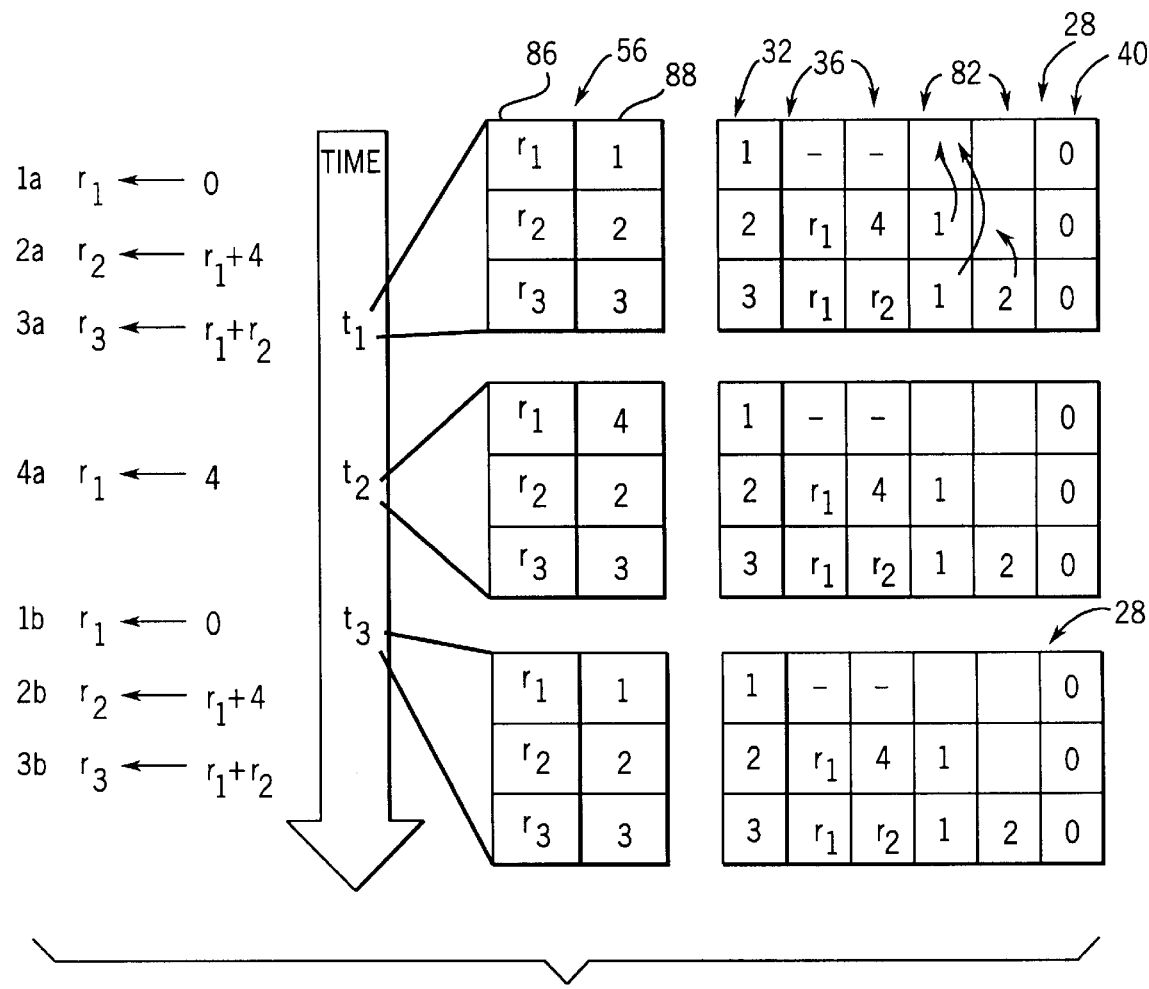
FIG. 10 is a graphical representation similar to that of FIG. 6 showing instructions executed in the alternative embodiment and the contents of the register source table and reuse memory during that execution.

Referring now to FIG. 10, the operation of this third embodiment is shown during execution of the instructions previously described with respect to FIG. 6. At $t_1$ after execution of instruction instances 1a, 2a, and 3a, the register source memory 56 has entries for $r_1$, $r_2$, and $r_3$. These entries indicate that the latest instruction to update these registers, e.g., 1, 2, and 3 respectively. The reuse memory 28 includes entries for instructions 1, 2, and 3 at tags 1, 2, and 3 respectively and the operand identifiers 36 as have been previously described.

Source indices 82 are also present in reuse memory 28 indicating dependence between instructions. Specifically, the entry for instruction 1 has no source index indicating that it is an independent instruction which does not derive its operands from the results of previous instructions. The entry for instruction 2 shows that its operand is derived from instruction 1 as indicated by an arrow and reflecting the fact that register $r_1$ used as an operand in instruction 2 is last loaded in instruction 1. This source index is derived from register source memory 56 by reviewing the register $r_1$ against the register names 86 in register source memory 56 to determine the source tag 88. Continuing, the source index 82 for the entry of instruction 3 in the reuse memory 28 indicate that its operands $r_1$ and $r_2$ are derived from the results from instruction 1 and 2 respectively as indicated by arrows in FIG. 10.

Now at instruction 4, $r_1$ has its value overwritten with a value of 4. Instruction 1 is not invalidated because its operand is not register 1. Instructions 2 and 3 are not invalidated because they are dependent instructions and their source instructions 1 and 2 have not been invalidated.

At $t_3$ at the beginning of the execution of the second instance of instructions 1, 2, and 3, all three entries for these instructions in reuse memory 28 are still valid and the results of each instruction may be reused without error. Because the reuse of these instructions is not dependent on an evaluation of the actual values of their operands, the reuse may occur simultaneously significantly shortening the effective execution time of these instructions. With sequences of instruction such as instructions 1, 2, and 3 of the example of FIG. 6, the forwarding of results 38 to processor 22 may occur essentially simultaneously as there is no need to resolve the operand of each preceding instruction prior to looking up the succeeding instruction. In other words, the result 38 for instruction 3b may be provided to the processor 22 without waiting for the execution of instructions 1b and 2b.

The above description has been that of a preferred embodiment of the present invention. It will occur to those that practice the art, that many modifications may be made without departing from the spirit and scope of the invention. For example, other techniques of identifying the validity of operands in registers, for example, time stamping, may be used provided the need to evaluate the operand is eliminated. In order to apprise the public of the various embodiments that may fall within the scope of the invention, the following claims are made.

We claim:

1. A computer for executing a program of instructions, the instructions including at least one operand, the instructions stored in memory at instruction addresses, the computer comprising:

fetching circuitry, obtaining a fetched instruction from memory at a fetched instruction address;

execution circuitry selectively executing fetched instructions to produce results;

a reuse memory, communicating with the fetching circuitry, holding linked operand identifiers, results and indices based on instruction addresses of previously executed instructions; and search circuitry receiving the fetched instruction address and searching the reuse memory for a valid matching entry having an index matching the fetched instruction address and when a valid matching entry is found instructing the execution circuitry to bypass the execution of the fetched instruction and use the result of the matching entry.

2. The computer of claim 1 wherein the operand identifiers are values of operands and wherein the search circuitry accepts a matching entry as valid when the operand identifier of the entry is the same as an operand of the fetched instruction.

3. The computer of claim 1 wherein the operand identifiers are names of registers holding operand values.

4. The computer of claim 1 wherein entries of the reuse memory further includes an invalidity flag indicating whether the result of the entry is valid based on the execution of instructions prior to the fetched instruction, and wherein the search circuitry accepts a matching entry as valid depending on the indication of the invalidity flag;

whereby evaluation of a value of an operand of the fetched instruction need not be performed.

5. The computer of claim 4 including:

register store detection circuitry detecting a store operation to a named register occurring prior to fetching of the fetched instruction;

invalidation circuitry communicating with the register store detection circuitry to set the invalidity flag of entries, having operand identifiers identifying the named register, to indicate the entries are invalid.

6. The computer of claim 1 including:

STORE detection circuitry a detecting store operation to a memory address occurring prior to fetching of the fetched instruction;

invalidation circuitry communicating with the STORE detection circuitry to set the invalidity flag of entries, having operand identifiers identifying the memory address, to indicate the entries are invalid.

7. The computer of claim 1 wherein the instruction reuse memory includes two sections, a LOAD section holding operand identifiers and results for LOAD instructions loading data from memory and a non-LOAD section holding operand identifiers and results for instructions other than LOAD instructions.

8. The computer of claim 1 wherein the entries of the reuse memory further holds a source index value identifying a source instruction whose result provides a value of an operand identified by the operand identifier of the entry.

9. The computer of claim 8 wherein the computer includes registers holding operands for execution and wherein the computer includes, in addition, a register source table indicating a last instruction to update a register of the computer and wherein the reuse memory determines the source index value of an entry by reviewing the register source table for a register matching the operand identifier of the entry and using the instruction last updating the register as the source index value for the entry.

10. The computer of claim 8 including:

REGISTER STORE detection circuitry detecting when the fetched instruction stores a value to a named register;

invalidation circuitry communicating with the REGISTER STORE detection circuitry to invalidate entries in the reuse memory having operand identifiers identifying the named register only when the source index value of the entry indicates no source instruction for that entry.

11. The computer of claim 10 wherein the invalidation circuitry further invalidates entries in the reuse memory whose source indices indicate an instruction of an invalidated entry.

* * * * *